United States Patent
Mosegaard et al.

(10) Patent No.: US 10,564,272 B2
(45) Date of Patent: Feb. 18, 2020

(54) DISPLAY OF IMAGING DATA IN A MOVING VIEWPORT

(71) Applicant: B-K Medical Aps, Herlev (DK)

(72) Inventors: Truis Mosegaard, Copenhagen (DK); Jakob Jensen, Valby (DK); Jens Mose Pedersen, Lyngby (DK); Christian J Duun-Christensen, Hilleroed (DK); Gert Seerup, Hilleroed (DK)

(73) Assignee: BK Medical Aps, Herlev (DK)

( * ) Notice: Subject to any disclaimer, the term of this patent is extended or adjusted under 35 U.S.C. 154(b) by 115 days.

(21) Appl. No.: 15/735,753

(22) PCT Filed: Jun. 15, 2015

(86) PCT No.: PCT/IB2015/054519
§ 371 (c)(1),
(2) Date: Dec. 12, 2017

(87) PCT Pub. No.: WO2016/203288
PCT Pub. Date: Dec. 22, 2016

(65) Prior Publication Data
US 2018/0172811 A1    Jun. 21, 2018

(51) Int. Cl.
*G01S 7/52* (2006.01)
*G01S 15/89* (2006.01)

(52) U.S. Cl.
CPC ...... *G01S 7/52063* (2013.01); *G01S 7/52042* (2013.01); *G01S 7/52085* (2013.01);
(Continued)

(58) Field of Classification Search
CPC ............. G01S 7/52063; G01S 7/52042; G01S 7/52085; G01S 15/8984; G01S 15/8988; G01S 15/8979
See application file for complete search history.

(56) References Cited

U.S. PATENT DOCUMENTS 4,790,321 A * 12/1988 Miwa ................ A61B 8/06
                                                        600/443
5,181,513 A * 1/1993 Touboul ............ A61B 5/02007
                                                        600/443
(Continued)

FOREIGN PATENT DOCUMENTS

EP    0717956 A2    6/1996
EP    1942352 A2    7/2008
(Continued)

OTHER PUBLICATIONS

Translation JP 10-033535.*
International Search Report for PCT/IB2015/054519 published as WO2016/203288 A1 dated Dec. 22, 2016.

*Primary Examiner* — Helen C Kwok
(74) *Attorney, Agent, or Firm* — Anthony M. Del Zoppo, III; Daugherty & Del Zoppo Co., LPA

(57) ABSTRACT

A system (800) includes an acquisition engine (837) that acquires ultrasound data for two or more modes with a first acquisition algorithm, including an image mode and a special mode. A rendering engine (834) employs a first rendering algorithm and displays the image in a main display window (902) and the special mode ultrasound data in a viewport (906) superimposed over the main display window. The acquisition engine acquires ultrasound data for the special mode using a second acquisition algorithm and the rendering engine displays a first portion of the generated special mode ultrasound data over the main display window and a second portion of the generated special mode ultrasound data over the viewport using a second rendering algorithm in response to the system receiving an input signal indicative of a movement of the viewport from a first location of the main display window to a second different position of the main display window.

20 Claims, 9 Drawing Sheets

(52) U.S. Cl.
CPC ...... *G01S 15/8984* (2013.01); *G01S 15/8988* (2013.01); *G01S 15/8979* (2013.01)

(56) References Cited

U.S. PATENT DOCUMENTS

| | | | | |
|---|---|---|---|---|
| 5,301,674 | A * | 4/1994 | Erikson | A61B 8/488 600/447 |
| 5,524,628 | A * | 6/1996 | Matsumoto | A61B 8/06 600/441 |
| 5,584,294 | A * | 12/1996 | Amemiya | G01S 15/8979 600/441 |
| 6,669,642 | B2 * | 12/2003 | Amemiya | A61B 8/06 600/453 |
| 7,744,533 | B2 * | 6/2010 | Kamiyama | A61B 8/469 600/407 |
| 2008/0167557 | A1 * | 7/2008 | Kozai | A61B 8/06 600/441 |
| 2008/0193004 | A1 * | 8/2008 | Mine | A61B 6/5247 382/131 |
| 2010/0056923 | A1 * | 3/2010 | Hyun | A61B 8/06 600/454 |
| 2015/0221091 | A1 * | 8/2015 | Sugiyama | A61B 6/502 382/131 |
| 2015/0257739 | A1 * | 9/2015 | Yao | A61B 8/06 600/431 |
| 2016/0066888 | A1 * | 3/2016 | Yao | A61B 8/463 600/431 |

FOREIGN PATENT DOCUMENTS

| | | | |
|---|---|---|---|
| JP | 10-033535 | * | 2/1998 |
| JP | H1033535 A | | 2/1998 |

* cited by examiner

DISPLAY OF IMAGING DATA IN A MOVING VIEWPORT

RELATED APPLICATION

This application is a national filing of PCT application Ser. No. PCT/IB2015/054519, filed Jun. 15, 2015, published as WO2016/203288 on Dec. 22, 2016. This application claims priority to PCT application Ser. No. PCT/IB2015/054519, published as WO2016/203288 on Dec. 22, 2016.

TECHNICAL FIELD

The following generally relates to displaying imaging data and more particularly to displaying imaging data in a moving viewport of a main window, and is described with particular application to ultrasound imaging. However, the following is also amenable to other imaging modalities.

BACKGROUND

Ultrasound imaging has provided useful information about the interior characteristics of an object or subject under examination. An ultrasound scanner has included a probe with a transducer array that is configured to transmit an ultrasound signal into the object or subject under examination. As the signal traverses the object or subject under examination, portions of the signal are attenuated, scattered, and/or reflected off structure and/or boundaries in the interior of the object or subject, with some of the reflections traversing back towards the transducer array. The later reflections are referred to as echoes and are detected by the transducer array.

In B-mode imaging, the echoes correspond to an axial slice through the object or subject and are processed to generate scanlines of a scanplane, or two dimensional image of the slice, which can be displayed via a monitor. B-mode scanplanes have been combined with color flow mapping (CFM) data and/or other special mode data. However, in order to maintain a reasonably high frame rate (e.g., 10-20 Hz) and full resolution (e.g., high line density), the CFM data is acquired and shown only in a smaller viewport superimposed over only a sub-portion of the B-mode image, with the B-mode image providing an anatomical frame of reference. Furthermore, when panning the viewport, the CFM data update has been delayed such that aged or non-current CFM data is displayed.

For example, FIGS. 1-3 show an approach in which the CFM data in the viewport is not refreshed until the viewport is moved to a new location. In FIG. 1, a main window 102 displays a B-mode image 104 and a viewport 106, which is located at a first location 108, displays first CFM data 110. In FIG. 2, the viewport 106 is being moved (e.g., dragged via a mouse) to a second different location 112. However, the first (now aged) CFM data 110 remains at the first location and the viewport 106 does not show any CFM data. In FIG. 3, the viewport 106 is at the second different location 112 (e.g., dropped via the mouse) and the CFM data is refreshed with new current CFM data 114 and the aged CFM data 110 is removed from the main window 102. In this example, the refresh rate of the main window 102 and the viewport 106 at the first or the second locations 108 and 112 is 10-20 Hz, but the refresh of the CFM data in the viewport 106 when moving the viewport 106 might now occur with a one or more second delay, depending on how long it takes the user to move and place the viewport 106.

FIGS. 4-7 show another approach in which refreshed CFM data lags in time behind the moving viewport 106 as a still image 202 and, likewise, the viewport 106 is not refreshed with the current CFM data 114 until it is at its new position 112. In this example, the refresh rate of the main window 102 and the viewport 106 at the first or the second locations 108 and 112 is 10-20 Hz, but the refresh of the CFM data when moving the viewport 106 might now occur with a 0.3 second or more delay until the viewport is at the new location 112. When moving the viewport 106 in these approaches, the acquisition algorithm is changed on the fly to acquire the lines within the viewport 106 for each update of the image data in the viewport 106. Typically the change of acquisition algorithm for the active scanning modes requires a large amount of recalculation of hardware settings. This is a reason for the lag in the image update within the viewport while it is moving.

Unfortunately, neither of the above approaches is well-suited for observing CFM data or other special mode data at least because during the time period in which the viewport 106 is being moved current (live, real-time) CFM data is not displayed. Rather, aged CFM data is displayed during this time period, and the CFM data in the viewport 106 is refreshed only such that it lags in time by 0.3 or more seconds behind current CFM data. In one instance, this renders these two approaches not very useful nor provides a good user experience.

SUMMARY

Aspects of the application address the above matters, and others.

In one aspect, a system includes processing mode memory with a plurality of special modes and acquisition algorithm memory with a plurality of acquisition algorithms. An acquisition engine acquires ultrasound data for two or more modes with a first acquisition algorithm, including an image mode and a special mode. An image processor is configured to process ultrasound data acquired for the image mode and generate an image indicative thereof. A special mode processor is configured to process ultrasound data acquired for the special mode and generate special mode ultrasound data. A rendering algorithm memory includes a plurality of rendering algorithms. A rendering engine employs a first rendering algorithm and displays the image in a main display window and the special mode ultrasound data in a viewport superimposed over a sub-region of the main display window. The acquisition engine acquires ultrasound data for the special mode in the whole region covered by the main display window using a second acquisition algorithm and the rendering engine displays a first portion of the generated special mode ultrasound data over the main display window and a second portion of the generated special mode ultrasound data over the viewport using a second rendering algorithm in response to the system receiving an input signal indicative of a movement of the viewport from a first location of the main display window to a second different position of the main display window.

In another aspect, a method includes acquiring first data using a first acquisition algorithm, refreshing a presentation of an ultrasound image in a main window of a display at the acquisition refresh rate, and refreshing a presentation of special mode data in a viewport overlaid over a sub-region of the main window at the acquisition refresh rate. The method further includes receiving a first signal indicating movement of the viewport within the main window, acquiring second data using a second different acquisition algorithm, superimposing, in response to the first signal, the special mode data over the image in the main window, and refreshing the presentation of the image in the main window and the special mode data in the main window and in the viewport at the acquisition refresh rates as the viewport is moved. The method further includes receiving a second signal indicating the viewport is at a different static location in the main window, removing, in response to the second signal, the special mode data from the main window, acquiring data using the first acquisition algorithm, and refreshing the presentation of the image in the main window and the special mode data in the viewport at the acquisition refresh rates.

In another aspect, an ultrasound imaging system includes a probe with a transducer array with a set of elements, wherein the set of elements produces echo signals indicative of ultrasound echoes received by the set of elements. An acquisition engine controls the set of elements to acquire ultrasound data using a first acquisition algorithm in response to a moveable viewport displayed via a display being at a static location overlaid over an ultrasound image displayed via the display and using a second different acquisition algorithm to control the set of elements to acquire ultrasound data in response to the moveable viewport transitioning between locations over the ultrasound image. A rendering engine displays the image and displays special mode data in the viewport using a first rendering algorithm in response to the moveable viewport being at the static location and displays the special mode data over the image and in the viewport using a second different rendering algorithm in response to the moveable viewport transitioning between the locations over the ultrasound image.

Those skilled in the art will recognize still other aspects of the present application upon reading and understanding the attached description.

BRIEF DESCRIPTION OF THE DRAWINGS

The application is illustrated by way of example and not limitation in the figures of the accompanying drawings, in which like references indicate similar elements and in which.

DETAILED DESCRIPTION

Figure 1:
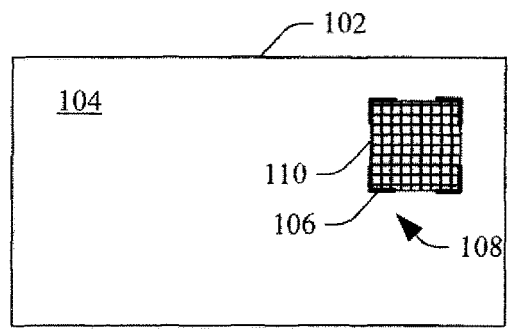
FIGS. 1-7 depict prior art.
Figure 2:
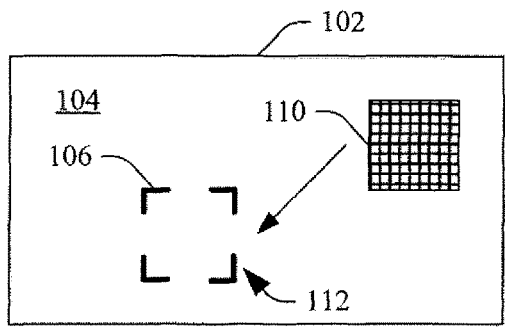
Figure 3:
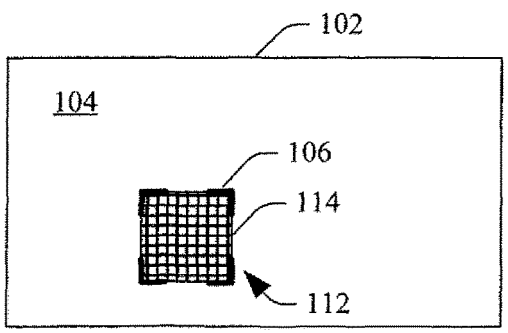
Figure 4:
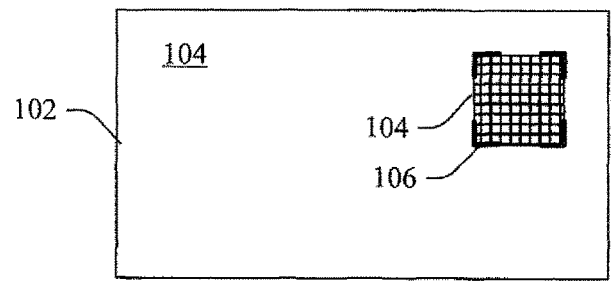
Figure 5:
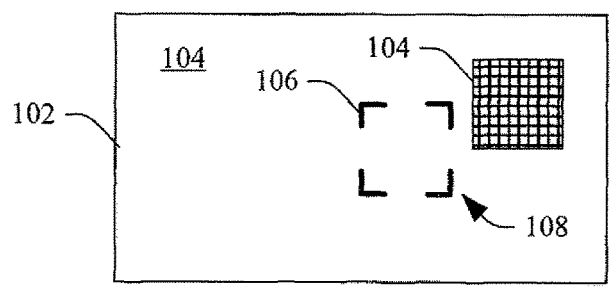
Figure 6:
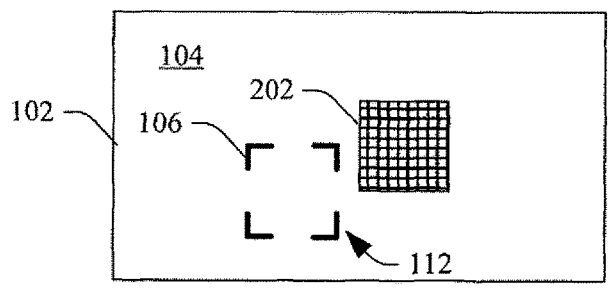
Figure 7:
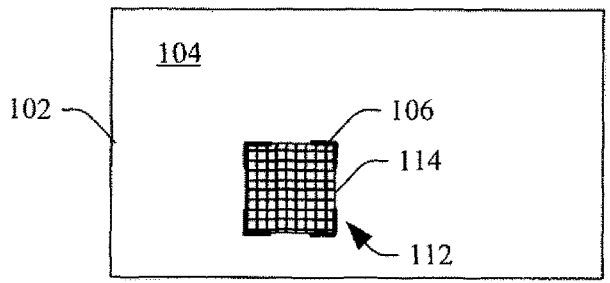
Figure 8:
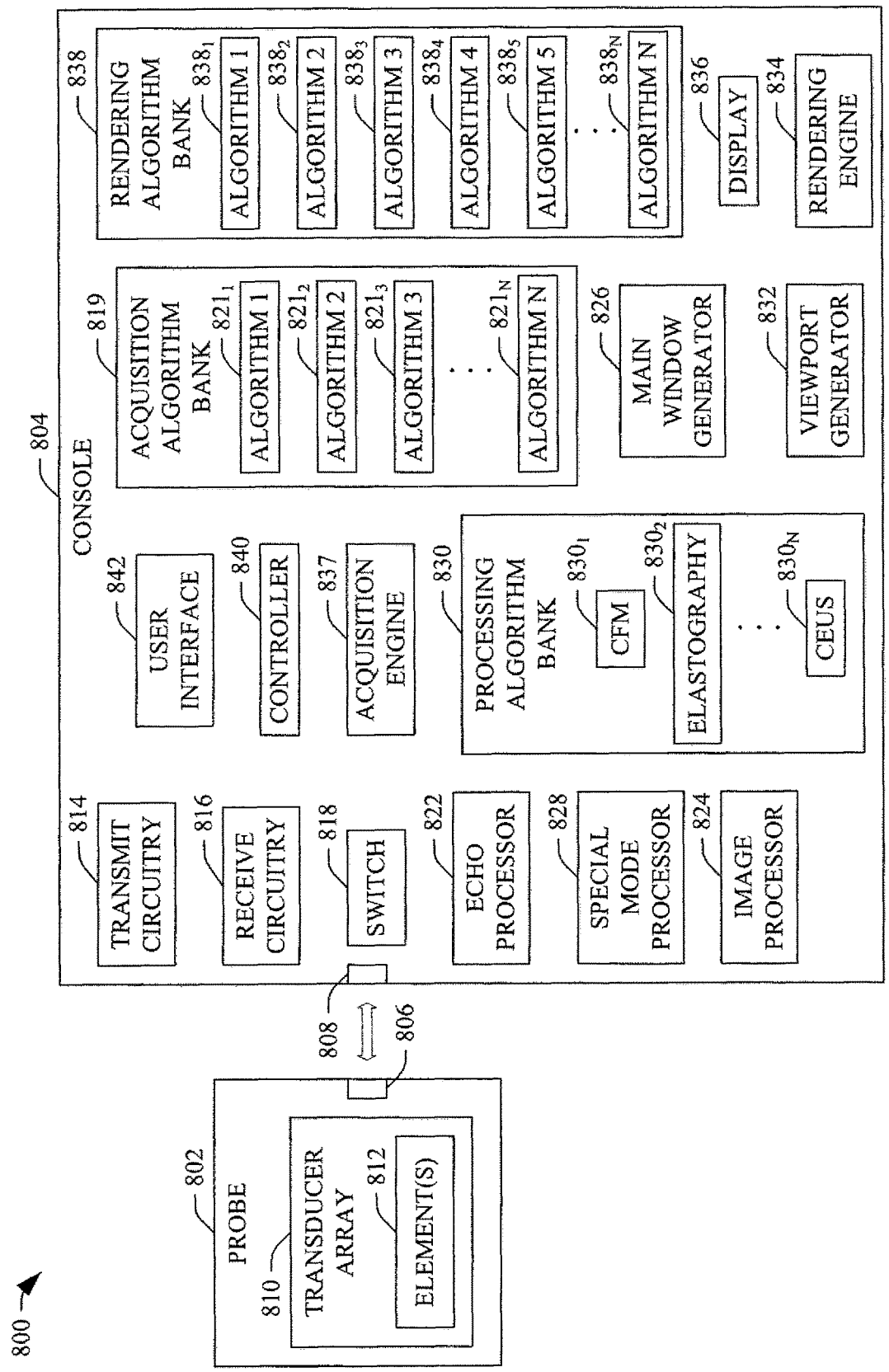
FIG. 8 schematically illustrates an example ultrasound imaging system.

FIG. 8 illustrates an example imaging system 800, such as ultrasound imaging system.

The imaging system 800 includes a probe 802 and a console 804. The probe 802 and the console 804 communicate with each other through corresponding complementary communication interfaces 806 and 808. The interfaces 806 and 808 are configured for communication through a wire (e.g., a cable), wirelessly (as shown), and/or other communication channel. Communication there between allows signals to be conveyed back and forth between the probe 802 and the console 804.

The probe 802 includes a transducer array 810 with a one-dimensional (1-D) or a two-dimensional (2-D) array of transducer elements 812. The transducer elements 812 are configured to transmit ultrasound signals and receive echo signals. Suitable configurations include, but are not limited to, linear, curved (e.g., convex), and phased arrays. The transducer array 810 can be fully populated or sparse.

The ultrasound imaging system 800 further includes transmit circuitry 814. The transmit circuitry 814 generates a set of radio frequency (RF) pulses that are conveyed to the transducer array 810. The set of pulses actuates a corresponding set of the transducer elements 812, causing one or more sets of the elements 812 to transmit ultrasound signals into an examination or scan field of view.

The ultrasound imaging system 800 further includes receive circuitry 816. The receive circuitry 816 receives echoes (RF signals) generated in response to the transmitted ultrasound signals from the transducer array 810. The echoes, generally, are a result of the interaction between the emitted ultrasound signals and the structure (e.g., flowing blood cells, organ cells, etc.) in the scan field of view.

The ultrasound imaging system 800 further includes a switch 818 configured to switch between the transmit circuitry 814 and the receive circuitry 816, depending on whether the transducer array 810 is operated in transmit or receive mode. In transmit mode, the switch 818 electrically connects the transmit circuitry 814 to the elements 812. In receive mode, the switch 818 electrically connects the receive circuitry 816 to the elements 812.

An acquisition algorithm bank 819 includes a set of acquisition algorithms $821_1$, $821_2$, $821_3$, ..., $821_N$ (collectively referred to herein as acquisition algorithm 821), where N is a positive integer. Each acquisition algorithm includes one or more parameters for acquiring image lines, e.g., with different and/or equal line densities, e.g., for B-mode imaging and/or the special mode imaging. Other acquisition parameters, such as a number of transmits per line, e.g., in case of CFM, can be changed. The image acquisition rate and/or resolution depend on the utilized acquisition algorithm. The acquisition algorithm could set different image rates for the B-mode and the special mode(s).

The ultrasound imaging system 800 further includes an echo processor 822 that processes received echoes. Such processing may include applying time delays, weighting on the channels, summing, and/or otherwise beamforming received echoes. Other processing may lower speckle, improve specular reflector delineation, and/or includes FIR filtering, IIR filtering, etc.

The ultrasound imaging system 800 further includes an image processor 824 that processes the beamformed data. For B-mode, the image processor 824 processes the beamformed data and generates a sequence of focused, coherent echo samples along focused scanlines of a scanplane. The image processor 824 can also be configured to generate an A-mode and/or other mode image.

The ultrasound imaging system 800 further includes a main window generator 826. The main window generator 826 generates a main window, which is configured to display the image generated by the image processor 824. In one instance, the main window includes an image display region of a graphical user interface, which may also include non-image display regions such as a region to activate image processing tools (e.g., gain, zoom, etc.) and/or operations.

The ultrasound imaging system 800 further includes a special mode processor 828 that processes the beamformed data. The special mode processor 828 processes the beamformed data based on one or more of special mode processing algorithms in a processing algorithm bank 830. Examples of suitable special mode processing algorithms include, but are not limited to, a color flow mapping (CFM) algorithm $830_1$, an elastography algorithm $830_2$, . . . and a contrast enhanced ultrasound (CEUS) algorithm $830_N$. The CFM algorithm $830_1$ can include velocity mode, power mode, vector Flow, etc. Other special mode processing algorithms are also contemplated herein.

The ultrasound imaging system 800 further includes a viewport generator 832. The viewport generator 832 generates a viewport, which is superimposed over a sub-portion of the image display region of the main window and which displays the data generated by the special mode processor 828. This data may be present in the entire viewport or only sub-portion thereof, e.g., where a threshold is used to determine whether data is displayed for a particular pixel or region of pixels. The viewport is at least moveable and, in one instance, resizable, re-shapeable, etc. As described in greater detail below, the special mode data can also be displayed in the main window.

The ultrasound imaging system 800 further includes an acquisition engine 837, which selects the acquisition algorithm 821 used to acquire scanlines for all imaging modes. In response to moving of a viewport, the acquisition engine 837 changes the acquisition algorithm 821 for at least one or up to all of the active imaging modes. For example, in one instance, the acquisition algorithm 821 is changed to acquire special mode scanlines for the whole imaging area populated with B-mode data, however, with a lower line density than initially in the viewport thus maintaining a useable acquisition refresh rate (e.g., 8-20 or higher Hz). As described in greater detail below, this data is used to update the display at the acquisition refresh rate while the viewport is moving. When the viewport stops moving the acquisition engine 837 changes the acquisition algorithm 821 back to what it was, i.e., only acquiring special mode scanlines within the viewport with the initial higher line density.

The ultrasound imaging system 800 further includes a rendering engine 834 and a display 836. The rendering engine 834 displays the main window and data therein through the display 836. Where a viewport is generated, the rendering engine 834 displays the viewport and the data therein superimposed over the main window and the data therein through the display 836. In this example, the rendering engine 834 displays the main window and data therein and the viewport and the data therein based on one or more of the rendering algorithms in a rendering algorithm bank 838.

In general, the algorithms 838 allows the rendering engine 834 to concurrently display live, real-time special mode data (i.e., as the data is processed and output by the processors 824 and 828) in both the main window 902 and the viewport 906, while the viewport 906 moves from the location 908 to the location 1102. By changing the acquisition algorithm 821 as mentioned above to acquire special mode scanlines covering the whole main window, current data is always displayed at a same frame rate (e.g., 8-20 or higher Hz), unlike the approaches discussed in connection with FIGS. 1-7 herein, which introduces a refresh time lag (e.g., ≥0.3 seconds) before the data is available and the update is performed when/while the viewport is being moved. As such, the approach described herein presents useful data even while the viewport moves and provides a good user experience.

Examples of acquisition and rendering algorithm sets are described next.

Figure 9:
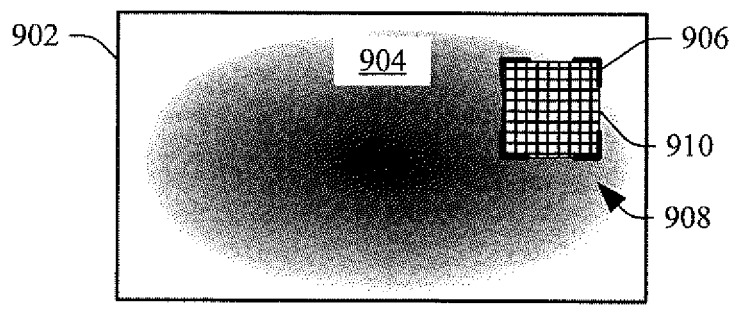
FIGS. 9-12 schematically illustrate example first display of data in a main window and in a viewport.

A first example algorithm set is described in connection with FIGS. 9-12. In FIG. 9, using acquisition algorithm $821_1$ and rendering algorithm $838_1$, a main window 902 displays an acquired B-mode image 904, and a viewport 906, which is located at a first location 908, displays first acquired special mode data 910 at full resolution.

Figure 10:
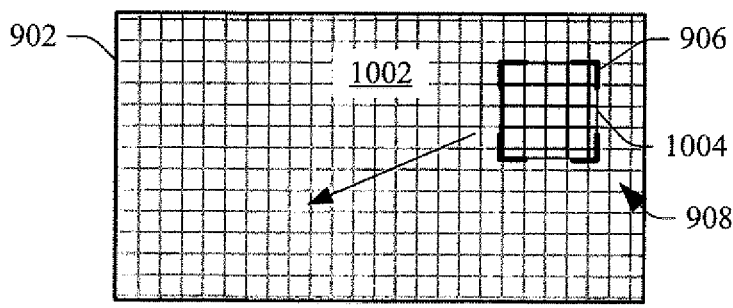

In FIG. 10, the viewport 906 is selected to be moved. In response thereto, the acquisition and rendering algorithms are changed to $821_2/838_2$ acquiring and displaying special mode data 1002 over the B-mode image 904. In this example, the acquisition algorithm $821_2$ acquires special mode scanlines at a lower resolution (e.g., ⅒, ⅓, ½, etc. of the full resolution) maintaining an image acquisition rate similar to the original (e.g. 8-20 or higher Hz), and the rendering algorithm $838_2$ displays special mode data 1002 in the whole main window with a lower intensity (e.g., ⅒, ⅓, ½, etc. of the full intensity). Further in response thereto, the rendering algorithm $838_2$ also displays a subpart 1004 of current special mode data 1002 in the viewport 906 with full intensity.

Figure 11:
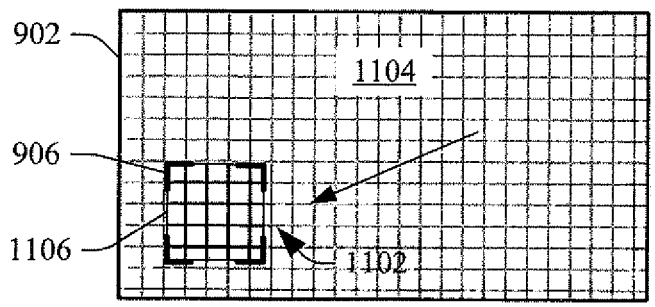

In FIG. 11, the viewport 906 is being moved to a location 1102. Current special mode data 1104 is displayed over the B-mode image 904, and current special mode data 1106 is displayed in the viewport 906, both refreshed at the acquisition refresh rate (e.g., 8-20 or higher Hz).

Figure 12:
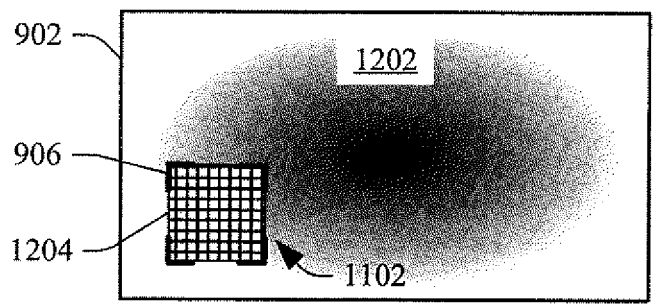
Figure 13:
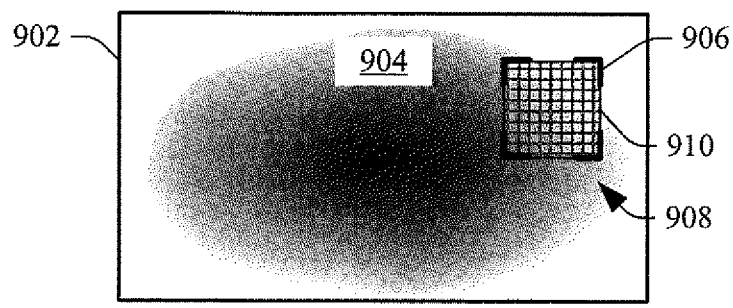
FIGS. 13-16 schematically illustrate example second display of data in a main window and in a viewport.
Figure 14:
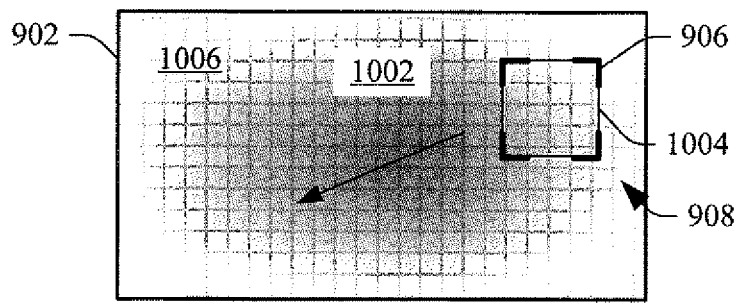
Figure 15:
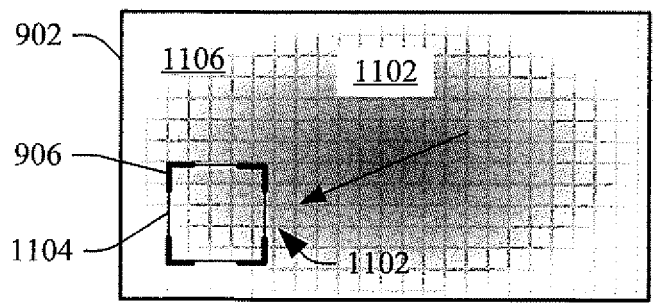
Figure 16:
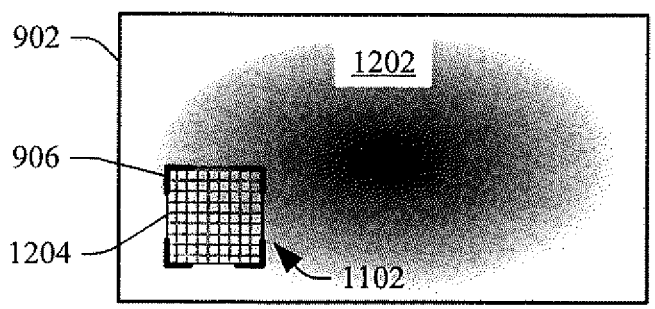
Figure 17:
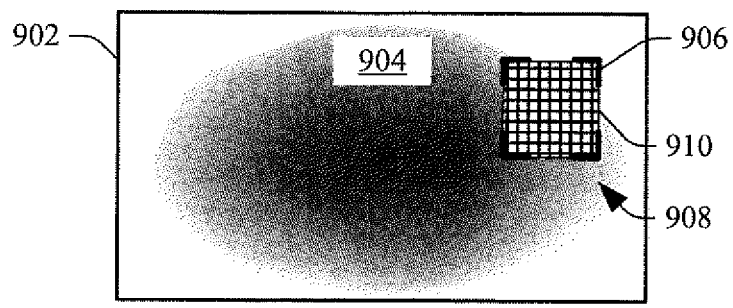
FIGS. 17-20 schematically illustrate example third display of data in a main window and in a viewport.
Figure 18:
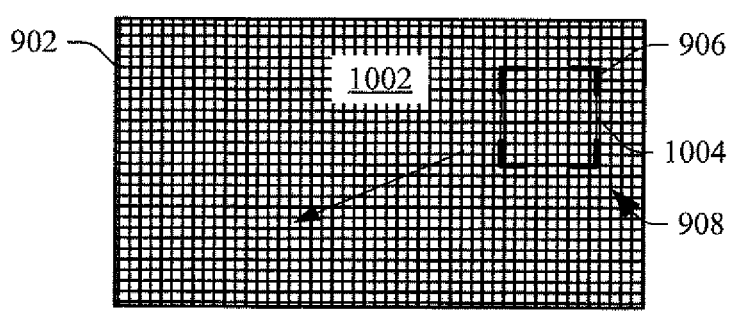
Figure 19:
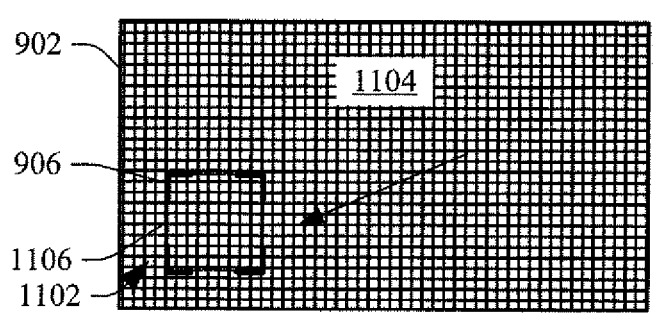
Figure 20:
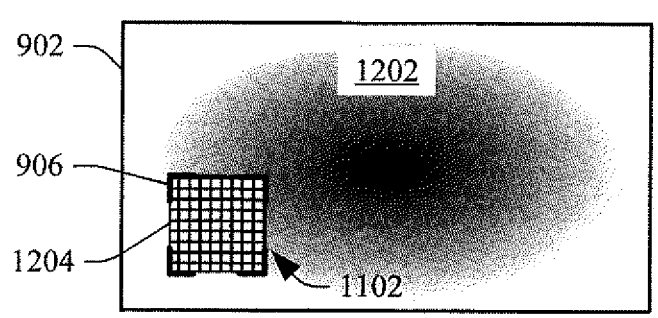
Figure 21:
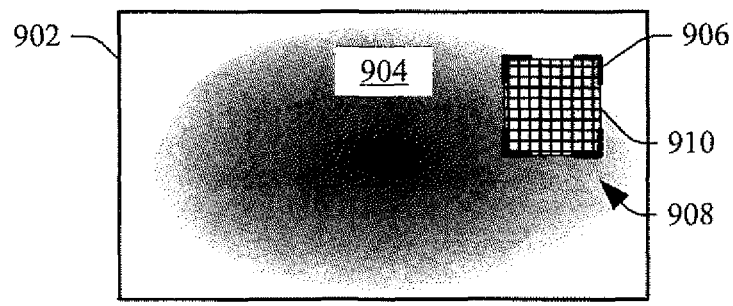
FIGS. 21-24 schematically illustrate example fourth display of data in a main window and in a viewport.
Figure 22:
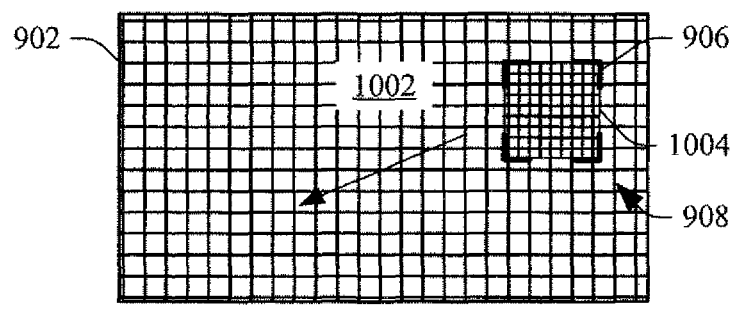
Figure 23:
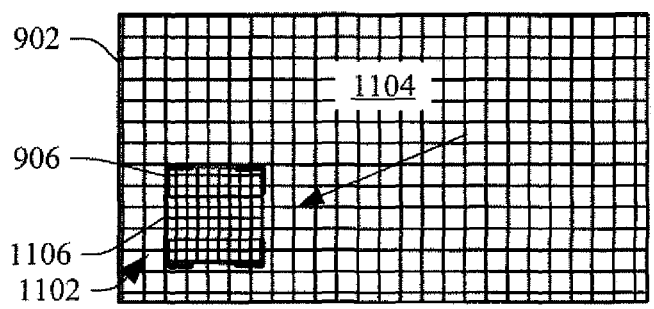
Figure 24:
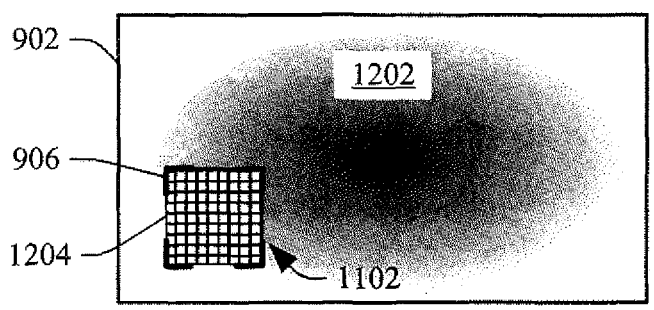
Figure 25:
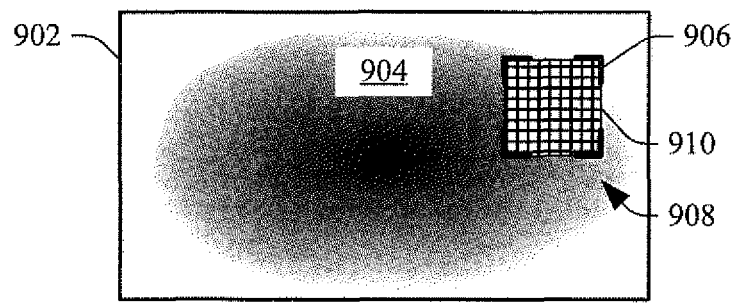
FIGS. 25-28 schematically illustrate example fifth display of data in a main window and in a viewport.
Figure 26:
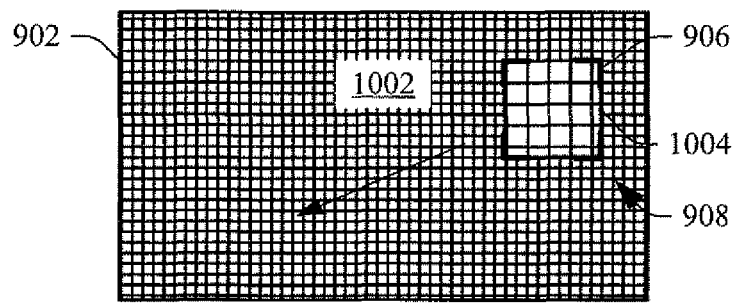
Figure 27:
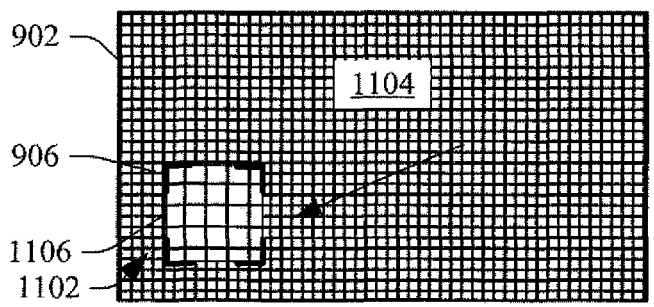
Figure 28:
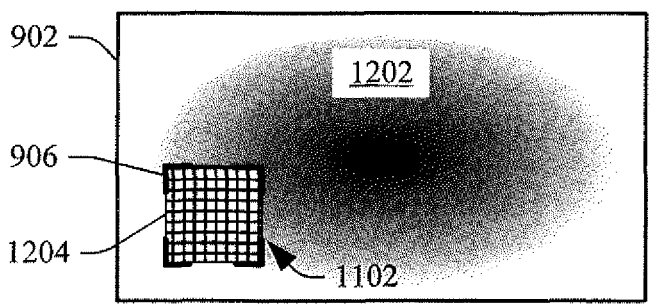

In FIG. 12, the viewport 906 is stopped moving at the location 1102. The acquisition and rendering algorithms are reverted back to the original set $821_1/838_1$ acquiring and displaying special mode data only within the viewport with full resolution.

In this example, there is no time lag in the display of the special mode data while the viewport 906 moves, unlike the approach shown in FIGS. 1-7. Updating the data displayed in the moving viewport is only a matter of changing the rendering area since data is available for the entire region 902 using the lower resolution acquisition algorithm $821_2$. The special mode data is refreshed when the viewport 906 is at either static location 908 and 1102 and while transitioning there between at the same refresh rate without any time delay. As such, current useful special mode data is always displayed, when the viewport is at a static location and when it is moving. Again, this provides current useful data and a good user experience.

A second example algorithm set is described in connection with FIGS. 13-16. The acquisition algorithms used when the viewport is static and moving are the same as in the first example, $821_1$ and $821_2$, but the rendering algorithms $838_1$ and $838_2$ are substituted by $838_3$ and $838_4$ which causes the special mode 910 (FIG. 13), 1002 and 1004 (FIG. 14), 1102 and 1104 (FIG. 15) and 1204 (FIG. 16) to be displayed over current B-mode images 904 (FIG. 13), 1006 (FIG. 14), 1106 (FIG. 15) and 1202 (FIG. 16) with an opacity level (e.g., 25%, 40%, 75%, etc.) such that the B-mode images can be seen through the special mode data. The opacity level can be determined via a protocol, by a user, automatically, etc. Furthermore, the opacity level can be changed.

A third example algorithm set $821_3/838_5$ is described in connection with FIGS. 17-20. The acquisition algorithm $821_3$ is similar to the algorithm $821_2$ except that the special mode scanlines are acquired over the B-mode image at full resolution. The rendering algorithm $838_5$ differs from $838_2$ in that it displays all special mode data 1002, 1004, 1104, and 1106 with full intensity. Likewise, the special mode data is displayed at the acquisition refresh rate without any lag.

A fourth example algorithm set $821_3/838_6$ is described in connection with FIGS. 21-24. The special mode scanlines are acquired over the B-mode image at full resolution. The rendering algorithm $838_6$ is similar to the algorithm $838_5$ except that the special mode data 1002 and 1104 are displayed in lower resolution while the special mode data 1004 and 1106 are displayed in full resolution. Again, the special mode data is displayed at the acquisition refresh rate without any lag.

Figure 29:
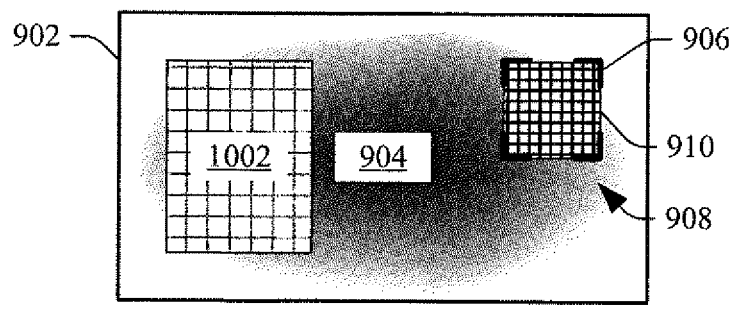
FIG. 29 schematically illustrates example sixth display of data in a main window and in a viewport.
Figure 30:
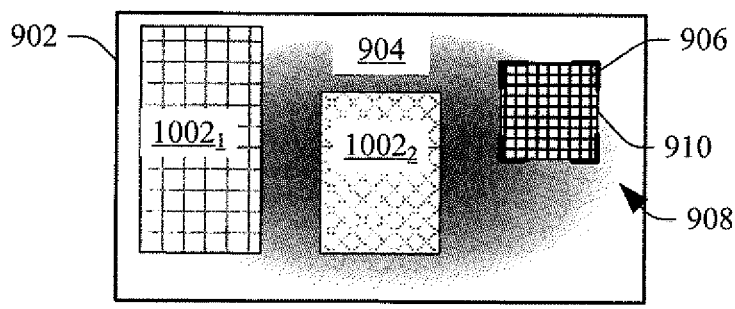
FIG. 30 schematically illustrates example seventh display of data in a main window and in a viewport.

A fifth example algorithm set $821_3/838_7$ is described in connection with FIGS. 25-28. The algorithm $838_7$ is the reverse of the algorithm $838_6$, with the special mode data 1002 and 1104 displayed in full resolution while the special mode data 1004 and 1106 are displayed in lower resolution. Again, the special mode data is displayed at the acquisition refresh rate without any delay. In FIG. 29, the special mode data 1002 is displayed over only a sub-portion of the main window 902. In FIG. 30, special mode data $1002_1$ and $1002_1$ are displayed in different regions of the main window 902 with different resolutions. Other embodiments include combinations and/or variations of FIGS. 9-30.

It is to be appreciated that be using one or more of the acquisition algorithms 821 acquiring the special mode scanlines for the whole imaging area while the viewport is being moved, acquisition reconfiguration requirements are decreased relative to a configuration in which the acquisition algorithm is updated for each new refresh of the image in the viewport. In one instance, this facilitates maintaining the refresh rate in the range of 8-20 or higher Hz before, throughout, and after the movement of the viewport from one location to another in the main window.

Returning to FIG. 8, the ultrasound imaging system 800 further includes a controller 840. The controller 840 is configured to control one or more of the components of the ultrasound imaging system 800. Such control can be based on available modes of operation. Examples of such modes of operation include one or more of A-mode, B-mode, elastography mode, color flow mapping mode, vector flow mode, spectral Doppler mode, etc.

The ultrasound imaging system 800 further includes a user interface (UI) 842. The UI 842 may include one or more input devices (e.g., a keyboard, a keypad, a trackball, a mouse, a touch sensitive pad or screen, a knob, a switch, a slider, etc.). The UI 842 can be used to invoke creation and display of a viewport, identify a processing algorithm for the data displayed in the viewport, identify an acquisition and a rendering algorithm for acquiring and displaying special mode data when moving the viewport, place the viewport, etc.

It is to be understood that one or more of the components of the system 800 (e.g., the processor 824 and/or 828, the controller 840, the generators 826 and/or 832, the acquisition and rendering engines 837 and 834, and/or other component) can be implemented by at least one processor (e.g., a central processing unit or CPU, a microprocessor, or the like) executing computer readable instructions encoded, embedded, stored, save, etc. on a non-transitory computer readable storage medium (which excludes transitory medium), such as physical memory and/or other non-transitory medium. The at least one processor can also execute instructions carried by a signal, carrier wave, and other transitory medium.

Figure 31:
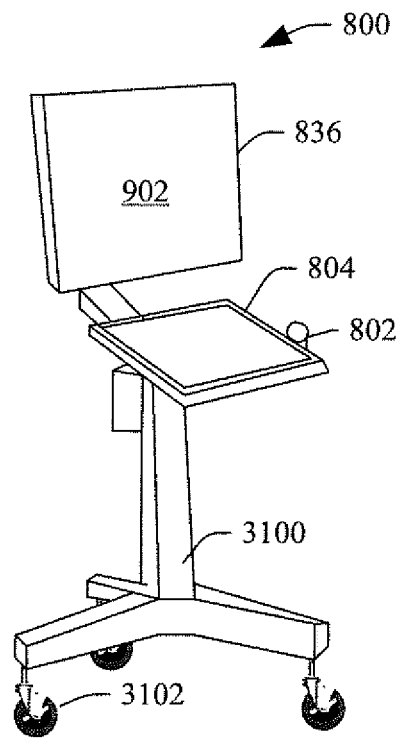
FIG. 31 schematically illustrates an example ultrasound imaging system.

FIG. 31 illustrates an example of the ultrasound imaging system 800. In this example, the display 836 and console 804 are separated devices integrated and part of a mobile cart 3100, which include movers 3102 such as wheels, casters, etc. In another configuration, the ultrasound imaging system 800 rests on a table, desk, etc., and does not include movers and is not integrated into a cart.

Figure 32:
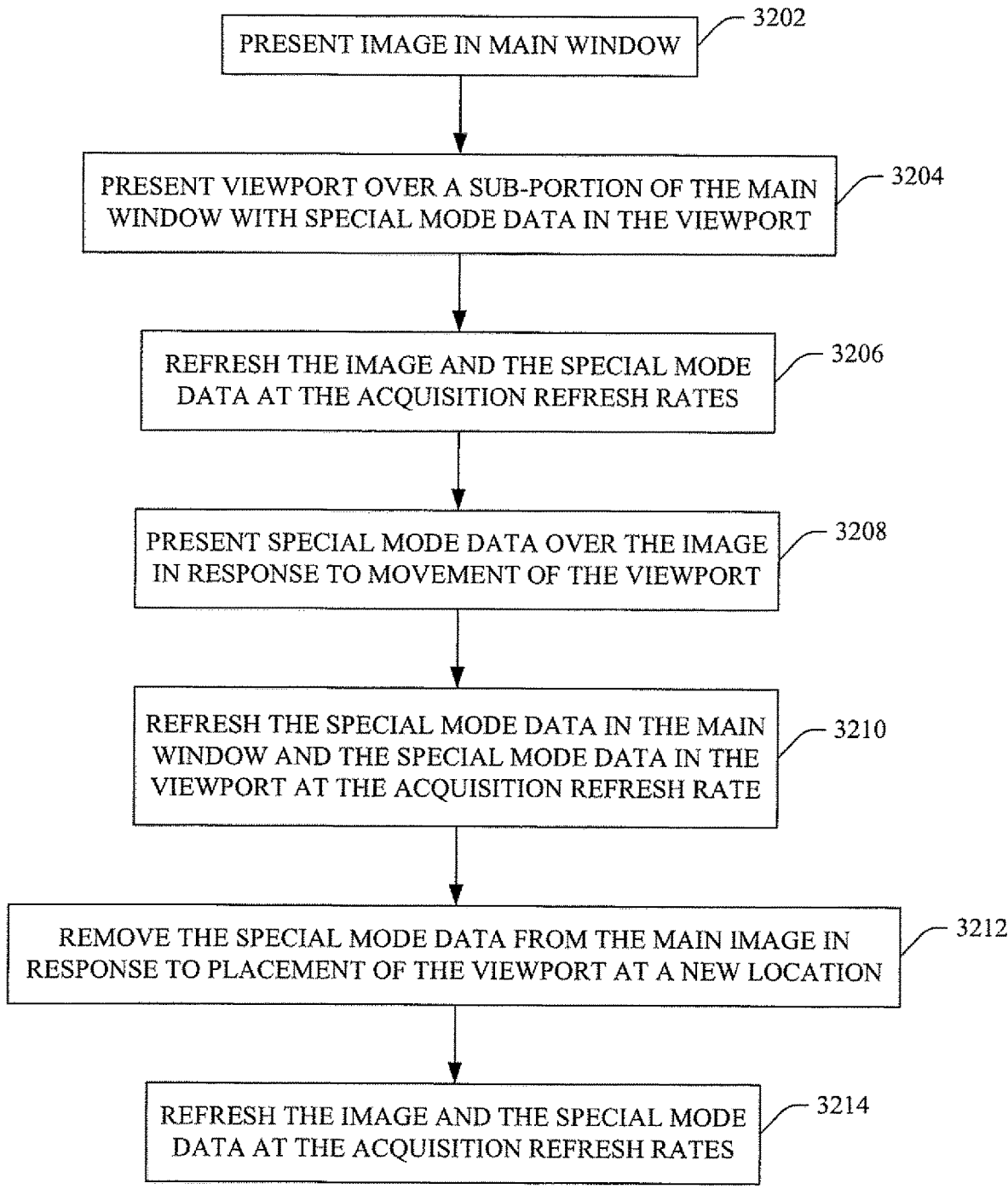
FIG. 32 illustrates a method in accordance with an embodiment(s) disclosed herein.

FIG. 32 illustrates a method for employing the probe 802.

It is to be appreciated that the order of the following acts is provided for explanatory purposes and is not limiting. As such, one or more of the following acts may occur in a different order. Furthermore, one or more of the following acts may be omitted and/or one or more additional acts may be added.

At 3202, an ultrasound image is presented in a main window of a display monitor. The ultrasound image can be generated as described herein by the system 800 and/or other ultrasound system.

At 3204, in response to receiving an input invoking display of special mode data, a viewport is created and superimposed over a sub-region of the main window and includes the special mode data.

At 3206, both the image in the main window and the special mode data in the viewport are refreshed with currently acquired data at the acquisition refresh rate.

At 3208, in response to receiving a first signal indicating movement of the viewport within the main window, the special mode data is acquired and superimposed over the image in the main window.

At 3210, both the special mode data in the main window and the special mode data in the viewport are refreshed with currently acquired data at the acquisition refresh rate as the viewport is moved within the main window. As described herein, this data can be displayed based on one or more of the algorithms 838, for example, without any introduced time delay between when the viewport is being moved and the display of data is refreshed.

At 3212, in response to receiving a second signal indicating the viewport is no longer moving, the color flow mapping data is removed from the main window.

At 3214, both the image in the main window and the special mode data in the viewport are refreshed with currently acquired data at the acquisition refresh rates.

The above may be implemented by way of computer readable instructions, which when executed by a computer processor(s), cause the processor(s) to carry out the described acts. In such a case, the instructions can be stored in a computer readable storage medium associated with or otherwise accessible to the relevant computer. Additionally or alternatively, one or more of the instructions can be carried by a carrier wave or signal.

The application has been described with reference to various embodiments. Modifications and alterations will occur to others upon reading the application. It is intended that the invention be construed as including all such modifications and alterations, including insofar as they come within the scope of the appended claims and the equivalents thereof.

What is claimed is:

1. A system, comprising:
    processing mode memory that stores processing instructions for a plurality of special modes;
    acquisition algorithm memory that stores a plurality of acquisition algorithms;
    an acquisition engine that acquires first ultrasound data for two or more modes with a first acquisition algorithm of the plurality of acquisition algorithms, including an image mode and a special mode;
an image processor configured to process the first ultrasound data acquired for the image mode and generate an image indicative thereof;
a special mode processor configured to process the first ultrasound data acquired for the special mode with instructions from the processing instructions for the plurality of special modes and generate first special mode ultrasound data;
rendering algorithm memory that stores a plurality of rendering algorithms; and
a rendering engine that employs a first rendering algorithm of the plurality of rendering algorithms and displays the image in a main display window and the first special mode ultrasound data in a viewport superimposed over a sub-region of the main display window,
wherein the acquisition engine acquires second ultrasound data for the special mode using a second acquisition algorithm acquiring special mode data within a whole region covered by the main display window, the special mode processor is configured to process the second ultrasound data and generate second special mode ultrasound data, and the rendering engine displays a first portion of the generated second special mode ultrasound data over an entirety of the main display window and a second portion of the generated second special mode ultrasound data over the viewport using a second rendering algorithm in response to the system receiving an input signal indicative of a movement of the viewport from a first location of the main display window to a second different location of the main display window.

2. The system of claim 1, wherein the special mode is one of color flow mapping and vector flow.

3. The system of claim 1, wherein the special mode is one of elastography and contrast enhanced ultrasound.

4. The system of claim 1, wherein the acquisition and rendering engines acquire and refresh a display of both the first and second portions at a refresh rate of at least 8 Hz before, during and after the movement of the viewport.

5. The system of claim 4, wherein the first and second portions are refreshed as the first and second portions become available by the image processor and the special mode processor.

6. The system of claim 4, wherein the first and second portions are refreshed without introducing a refresh time lag.

7. The system of claim 1, wherein the rendering engine displays the first portion of the second special mode ultrasound data in the main display window at a first resolution and the second portion of the second special mode ultrasound data in the viewport at a second resolution during the movement of the viewport.

8. The system of claim 7, wherein the first and second resolutions are the same.

9. The system of claim 7, wherein the first and second resolutions are different.

10. The system of claim 7, wherein, in response to the viewport being at the second location, the rendering engine removes the first portion of the second special mode ultrasound data from the main display window, the acquisition engine acquires third ultrasound data using the first acquisition algorithm, the special mode processor processes the third ultrasound data acquired and generates third special mode ultrasound data, and the rendering engine displays the image in the main display window and the third special mode ultrasound data in the viewport using the first rendering algorithm.

11. The system of claim 7, wherein the rendering engine displays the first portion of the second special mode ultrasound data in the main display window at a first intensity level and the second portion of the second special mode ultrasound data in the viewport at a second intensity level during the movement of the viewport, wherein the first intensity level is less than the second intensity level.

12. The system of claim 7, wherein the rendering engine displays the first and second portions of the second special mode ultrasound data in the main display window and the viewport at a predetermined opacity level which causes concurrent display of both the first and second portions of the second special mode ultrasound data and the image with the image as background visible through the first and second portions of the second special mode ultrasound data.

13. The system of claim 7, wherein the rendering engine displays the second portion of the second special mode ultrasound data in the viewport at a third resolution in response to the viewport transitioning being at the first or the second location, wherein the second and third resolution are different.

14. The system of claim 13, wherein the second resolution is less than the third resolution.

15. A method, comprising:
acquiring first data an acquisition refresh rate using a first acquisition algorithm;
refreshing a presentation of an ultrasound image in a main window of a display at the acquisition refresh rate based on the acquired first data;
refreshing a presentation of first special mode data in a viewport overlaid over a sub-region of the main window at the acquisition refresh rate based on the acquired first data;
receiving a first signal indicating movement of the viewport within the main window;
acquiring second data using a second different acquisition algorithm;
superimposing, in response to the first signal, second special mode data, which is generated based on the acquired second data, over an entirety of the image in the main window;
refreshing the presentation of the second special mode data over the entirety of the image in the main window at the acquisition refresh rate as the viewport is moved;
receiving a second signal indicating the viewport is at a different static location in the main window;
removing, in response to the second signal, the second special mode data from the main window;
acquiring third data using the first acquisition algorithm; and
refreshing the presentation of the image in the main window and third special mode data, which is generated based on the acquired third data in the viewport at the acquisition refresh rate.

16. The method of claim 15, further comprising:
displaying the second special mode data in the viewport at a first resolution; and
displaying the second special mode data in the main window at a second resolution, wherein the second resolution is less than the first resolution.

17. The method of claim 15, further comprising:
displaying the second special mode data in the viewport at a first intensity level; and displaying the second special mode data in the main window at a second intensity level, wherein the second intensity level is less than the first intensity level.

18. The method of claim 15, further comprising:
displaying the second special mode data in the main window and the viewport at a first transparency level.

19. The method of claim 15, further comprising:
refreshing the presentation of the second special mode data in the viewport at the acquisition refresh rate as new special mode data becomes available and without any time delay.

20. An ultrasound imaging system, comprising:
a probe, including: a transducer array with a set of elements, wherein the set of elements produces echo signals indicative of ultrasound echoes received by the set of elements;
an acquisition engine that controls the set of elements to acquire ultrasound data using a first acquisition algorithm in response to a moveable viewport displayed via a display being at a static location overlaid over an ultrasound image displayed via the display and using a second different acquisition algorithm to control the set of elements to acquire ultrasound data in response to the moveable viewport transitioning between locations over the ultrasound image; and
a rendering engine that displays the ultrasound image and displays special mode data in the moveable viewport using a first rendering algorithm in response to the moveable viewport being at the static location and displays the special mode data over the ultrasound image and in the moveable viewport using a second different rendering algorithm in response to the moveable viewport transitioning between the locations over the ultrasound image.

* * * * *